United States Patent
Picciotto

(10) Patent No.: US 6,388,452 B1
(45) Date of Patent: May 14, 2002

(54) DEVICE FOR SENSING MEDIA THICKNESS USING CAPACITANCE MEASUREMENTS

(75) Inventor: Carl E. Picciotto, Menlo Park, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/556,899

(22) Filed: Apr. 20, 2000

(51) Int. Cl.[7] ............................................. G01R 27/26
(52) U.S. Cl. ...................... 324/663; 324/452; 324/671
(58) Field of Search ...................... 24/452, 551, 661, 24/663, 671, 690, 674, 686, 687; 427/10

(56) References Cited

U.S. PATENT DOCUMENTS

| | | | |
|---|---|---|---|
| 4,256,299 A | | 3/1981 | Hogenson ..................... 271/262 |
| 4,378,109 A | | 3/1983 | Takahashi et al. ........... 271/263 |
| 4,937,460 A | | 6/1990 | Duncan ....................... 250/561 |
| 4,947,131 A | * | 8/1990 | Mayer |
| 5,121,068 A | | 6/1992 | Baker .......................... 324/690 |
| 5,138,178 A | | 8/1992 | Wong et al. ................. 250/559 |
| 5,485,082 A | * | 1/1996 | Wisspeintner |
| 5,530,368 A | * | 6/1996 | Hildebrand |
| 5,531,434 A | | 7/1996 | Kerschner ................... 271/263 |
| 5,546,008 A | * | 8/1996 | Sminchak |
| 5,742,167 A | | 4/1998 | Haynes ........................ 324/671 |
| 5,760,589 A | * | 6/1998 | Katsuie |
| 5,934,140 A | | 8/1999 | Jackson et al. ................ 73/159 |
| 5,962,861 A | | 10/1999 | Fowler ................... 250/559.27 |
| 5,966,018 A | | 10/1999 | Edmunds et al. ........... 324/663 |
| 6,028,318 A | | 2/2000 | Cornelius .............. 250/559.27 |

OTHER PUBLICATIONS

John D. Olivas & Bruce Lairson—Microelectromechanical Sensors Based on Magnetoresistance—Jun. 2001—p. 38 of NASA Tech Briefs.
Tim E. Roth—Capacitive Sensor for Measuring Level of Liquid Nitrogen—Jun. 2001—p. 39 of NASA Tech Briefs.

* cited by examiner

Primary Examiner—Michael J. Sherry
Assistant Examiner—Trung Nguyen
(74) Attorney, Agent, or Firm—Trueman H. Denny, III

(57) ABSTRACT

A device for sensing media thickness using capacitance measurements includes first and second supports that are moveable relative to each other and a variable capacitance capacitor comprising first and second electrodes that have a variable gap disposed between the electrodes and a dielectric medium disposed in the variable gap. The dielectric medium can be a gas or a vacuum. The first and second electrodes are disposed on a portion of the first and second supports respectively and are disposed opposite each other in substantially facing relation. The electrodes are spaced apart by a first distance. When a media whose thickness is to be measured and the supports are urged into contact with one another, the electrodes are displaced to a second distance. The media is not disposed in the variable gap and is not in contact with the electrodes so that the capacitance of the variable capacitor when the electrodes are in the second position is determined by the distance between the electrodes in the second position and the dielectric constant of the dielectric medium in the variable gap so that the thickness of the media is derived, irrespective of the dielectric properties of the media, by electronically measuring the capacitance between the electrodes.

21 Claims, 12 Drawing Sheets

DEVICE FOR SENSING MEDIA THICKNESS USING CAPACITANCE MEASUREMENTS

BACKGROUND OF THE INVENTION

The present invention relates generally to a device for capacitively sensing media thickness. More specifically, the present invention relates to a device for sensing the thickness of a media by using a variable capacitance capacitor that includes electrodes having a variable gap disposed therebetween and a dielectric of gas disposed in the variable gap. The thickness of the media is determined by measuring the capacitance between the electrodes. The capacitance between the electrodes is determined by the distance between the electrodes and the dielectric constant of the gas disposed in the variable gap and not by the dielectric properties of the media whose thickness is being measured.

BACKGROUND ART

Media thickness sensors are employed in media handling systems such as inkjet printers, laser printers, photocopying machines, document scanners, facsimile machines, and film production processes, just to name a few. Media thickness sensors can be implemented using a variety of technologies, such as mechanical sensors, optical sensors, and capacitive sensors.

A typical mechanical thickness sensor includes at least one member that is connected to a measurement circuit. The member is operative to engage a surface of a media whose thickness is to be measured. Contact between the member and the media results in the member being displaced. The measurement circuit measures the displacement of the member and generates a signal indicative of the thickness of the media. One disadvantage of mechanical thickness sensors is that the complexity and cost of the mechanical elements can be prohibitive in applications that require low cost, mechanical simplicity, and compact size. Another disadvantage of mechanical thickness sensors is that the mechanical elements are prone to failure and can require periodic maintenance and adjustment in order to maintain peak operational efficiency and measurement accuracy.

An optical thickness sensor can include a light source, such as a light-emitting diode (LED) and a light-sensitive element, such as a photodiode. The LED can be electrically driven by a power source, such as a constant-current source, and an output of the photodiode can be connected to a measurement circuit. Typically, the LED and the photo diode are positioned so that a beam of light from the LED is incident on the photodiode. The beam is either reflected off of a surface of the media whose thickness is to be measured or the beam is transmitted through the media. The output signal from the photodiode is proportional to the intensity of light incident on the photodiode and is indicative of the thickness of the media. One major disadvantage of the optical thickness sensor is that the accuracy of the thickness measurement is highly dependent on the optical properties of the media being measured. For example, if the media is opaque, then little or no light from the LED will reach the photodiode. Subsequently, the optical thickness sensor will not accurately measure the thickness of opaque media. Similarly, if the media is highly reflective of light or is translucent (clear), then there will be little or no variation in the intensity of light incident on the photodiode. Resulting will be inaccurate thickness measurements for reflective or clear media of different thicknesses. Another type of optical sensor measures thickness by reflecting light off of the media or a reflective surface in contact with the media into a light sensor. The position of the reflected light on the light sensor is indicative of the thickness of the media. Disadvantages of reflective sensors include electrical and mechanical complexity, high cost, and precision alignment of the optical components. A second disadvantage of the optical thickness sensor is that the sensor is often tuned to measure the thickness of a narrow range of media types or only of a specific type of media. Resulting, is a lack of flexibility in measuring a wide variety of media types. For example, the optical thickness sensor may be tuned to measure the thickness of white printer paper only. A third disadvantage of the optical thickness sensor is that if the media is of substantially uniform thickness, but has variable optical properties, then those variations in optical properties can result in inaccurate thickness measurements.

The use of capacitive elements to measure the thickness of a media is well known in the art. In a typical capacitive thickness sensor, opposed electrodes are urged into contact with opposed surfaces of a media whose thickness is to be measured. The media is disposed intermediate between the electrodes and the capacitance measured between the electrodes is a function of the dielectric properties of the media, the area of the electrodes, and the distance between the electrodes, so that the capacitance is determined by the following equation:

$$C = (\in_m * A) \div d$$

Where:

C=The capacitance measured between the electrodes;

$\in_m$=The dielectric constant of the media;

A=The area of the electrodes; and d=The spacing between the electrodes.

The change in capacitance between the electrodes can be sensed by appropriate electronic circuitry that produces a signal that is indicative of the thickness of the media. The sensing circuitry is well known in the art. For example, the electrodes can be in electrical communication with a constant current source. The voltage potential measured between the electrodes will increase linearly with time until a reference voltage is reached. The amount of time required for the voltage to reach the reference voltage is proportional to the thickness of the media. For instance, for thicker media, the time it takes to reach the reference voltage is shorter. Accordingly, based on the equation above, both the capacitance and the time it takes the voltage to reach the reference voltage decrease with increasing distance (thickness) of the media d.

In FIG. 1, a prior art capacitive thickness sensor 200 is shown. The sensor 200 includes electrically conductive plates 203 and 205 that are disposed opposite each other and are in physical contact with opposite surfaces 202 and 204 respectively, of a media 201 whose thickness d is to be measured. The plate 205 can be disposed on a support structure 209 that is operative to contain the plate 205 and can also serve as a surface upon which the media rests during the thickness measurement. In a typical application, the plates 203 and 205 will have identical surface areas a. The plate 203 is urged into contact with the media 201 by a biasing means 211 that is attached to a stationary support element 207. The biasing means 211 can be a spring, for example. Depending on the thickness of the media 201, the plate 203 is displaced 213 in response to the thickness of the media 201 so that when the media 201 is urged between the plates 203 and 205 the distance between the plates 203 and 205 is substantially equal to the thickness d of the media 201. Electrical connections 215 and 217 electrically communicate the plates 203 and 205 respectively to a capacitance sensing unit 221. The capacitance sensing unit 221 can use any method, including the one discussed above, to measure the capacitance between the plates 203 and 205. An output signal 222 from the capacitance sensing unit 221 can be communicated to a control unit 223 that uses the signal to compute the thickness of the media 201. For instance, if the media 201 has a dielectric constant $\in_m$, a know area a for the plates 203 and 205, and the output signal 222 is indicative of a capacitance value of C, then the above equation can be used by the control unit 223 to compute the distance d between the plates 203 and 205, wherein the distance d is substantially equal to the thickness of the media 201. In the prior art capacitive thickness sensor 200, the capacitance measured between the plates 203 and 205 is inversely proportional to the distance d between the plates 203 and 205.

One disadvantage of the prior art capacitive thickness sensor 200 is that the accuracy of the thickness measurement will vary with changes in the dielectric constant $\in_m$ of the media 201 due to environmental conditions such as temperature and humidity and due to local variations in the dielectric constant $\in_m$ of the media 201 at different portions of the media 201. Additionally, different types of media or different brands of media have a significant impact on changes to the dielectric constant $\in_m$ of the media. Subsequently, the thickness measurement is not an absolute one, rather it is a derived measurement that is directly dependent on the dielectric constant $\in_m$. Another disadvantage of the prior art capacitive thickness sensor 200 is that the plates 203 and 205 must be maintained in fixed relation to each other so that the distance d between the plates 203 and 205 does not vary, i.e. the plates 203 and 205 must be maintained in parallel relation to each other. The biasing means 211 is operative to urge the plates 203 and 205 into contact with the media 201 with sufficient force to establish the parallel relation between the plates 203 and 205 and to ensure the entire surface area a of the plates 203 and 205 is in snug contact with the media 201. However, that force can result in the plates 203 and 205 compressing (squishing) the media so that the actual thickness of the media is reduced by the compressive force of the plates 203 and 205. Resulting is an inaccurate thickness measurement. Additionally, if the media 201 is in motion while the plates 203 and 205 are in contact with the media 201, that motion can result in heat generated by friction between the plates 203 and 205 and the media 201. The dielectric constant $\in_m$ can vary with temperature thereby affecting the accuracy of the thickness measurements. Moreover, motion between the plates 203 and 205 can result in wear and damage to the media 201 and the plates 203 and 205. For example, if the media 201 is a film, excessive pressure from the plates 203 and 205 could scratch the film.

Changes in the dielectric constant $\in_m$ due to environmental conditions such as temperature and humidity are also addressed by the prior art thickness sensors as illustrated in FIG. 2. In FIG. 2, a prior art reference capacitor 210 includes plates 233 and 235 that are contained in a housing 231 that is operative to disposed the plates 233 and 235 opposite each other and in fixed relation to each other, thereby defining a constant reference distance $d_R$ between the plates 233 and 235. A dielectric material 237 is disposed between the plates 233 and 235 and is in contact with the plates 233 and 235. The dielectric material 237 has a predetermined dielectric constant $\in_R$. The plates 233 and 235 are connected to the capacitance sensing unit 221 by electrically conductive leads 225 and 227 respectively. Additionally, the electrical connections 215 and 217 as discussed above in reference to FIG. 1, are also connected to the capacitance sensing unit 221. The capacitance sensing unit 221 measures the capacitance of the reference capacitor 210 and uses the measured capacitance to either compensate for or to nullify the variations in the capacitance measured between the plates 203 and 205 (see FIG. 1) due to the above mentioned environmental conditions. One disadvantage to using the reference capacitor 210 is that it adds to the complexity of the capacitive thickness sensor 200 of FIG. 1. For instance, the use of the reference capacitor 210 can require additional circuitry for the capacitance sensing unit 221. In some manufacturing operations, the housing 231 can be adapted to allow for manual adjustments to the reference distance $d_R$ by using a micrometer, for example, to adjust the spacing between the plates 233 and 235 so that the value of the reference capacitor 210 is known value before thickness measurements are made using the capacitive thickness sensor 200. A second disadvantage to using the reference capacitor 210 is that the relationship between the dielectric constant of the calibrant ($\in_R$) and variations in the dielectric constant of the media $\in_m$ may not be a clearly understood relationship. Consequently, the difference ($\Delta$) between $\in_R$ and $\in_m$ may not correspond between different media.

Therefore, there is a need for a capacitive thickness sensor that is mechanically simple, is low cost, requires no maintenance, can sense media thickness irrespective of the dielectric or optical properties of the media, can accurately sense the thickness of a wide variety of media types, can compensate for environmental conditions without the use of additional sensors, eliminates damage to the media and to the sensor, and does not squish the media.

SUMMARY OF THE INVENTION

The present invention is an improvement in the design of capacitive thickness sensors that can be used for measuring the thickness of a media. The aforementioned limitations and disadvantages of various types of media thickness sensors are addressed by the present invention.

The present invention is mechanically simple, can be constructed from a few parts, and can be made from low cost materials such as plastic, for example. Moreover, the present invention does not require maintenance, calibration, or adjustments.

The dielectric and/or optical properties of the media to be measured and any inconsistencies in those properties have no effect on the accuracy of the media thickness measurements of the present invention because the electrodes of the present invention do not contact the media to be measured and are positioned away from the media to be measured so that the dielectric properties of the media do not interact with the electrodes.

Additionally, because the electrodes of the present invention do not contact the media, the amount of force required to effectuate measuring the thickness of the media is reduced, thereby minimizing compression (squishing) of the media that can result in inaccurate thickness measurements. Another benefit of the present invention is that damage to the media and to the electrodes is eliminated because the electrodes do not contact the media.

The present invention can be used to measure media thickness and to compensate for environmental conditions using the same set of electrodes. Therefore, both the mechanical complexity of using additional components to implement environmental compensation and the additional circuitry required are eliminated by the present invention.

Broadly, the present invention is embodied in a device for capacitively sensing media thickness that includes first and second supports that are moveable relative to each other and a variable capacitance capacitor comprising first and second electrodes that have a variable gap disposed between the electrodes and a dielectric medium disposed in the variable gap. The dielectric medium can be a vacuum or a gas. The first and second electrodes are disposed on a portion of the first and second supports respectively and are disposed opposite each other in substantially facing relation. The electrodes are spaced apart by a first distance.

When a media whose thickness is to be measured and the supports are urged into contact with one another, the electrodes are displaced to a second distance. The media is not disposed in the variable gap and is not in contact with the electrodes so that the capacitance of the variable capacitor when the electrodes are in the second position is determined by the distance between the electrodes in the second position and the dielectric constant of the dielectric medium.

In another embodiment of the present invention, the device includes a reference stop positioned to maintain a consistent spacing between the electrodes when the electrodes are spaced apart by the first distance so that the capacitance of the capacitor when the electrodes are spaced apart by the first distance is determined primarily by the dielectric constant of the dielectric medium in the variable gap and not by variations in spacing between the electrodes. The consistent spacing between the electrodes can be used to electronically measure a reference capacitance between the electrodes that can be used to compensate for environmental conditions including temperature and humidity that can affect the accuracy of the capacitance electronically measured between the electrodes when the electrodes are spaced apart by the second distance.

Other aspects and advantages of the present invention will become apparent from the following detailed description, taken in conjunction with the accompanying drawings, illustrating by way of example the principles of the present invention.

DETAILED DESCRIPTION

Figure 1:
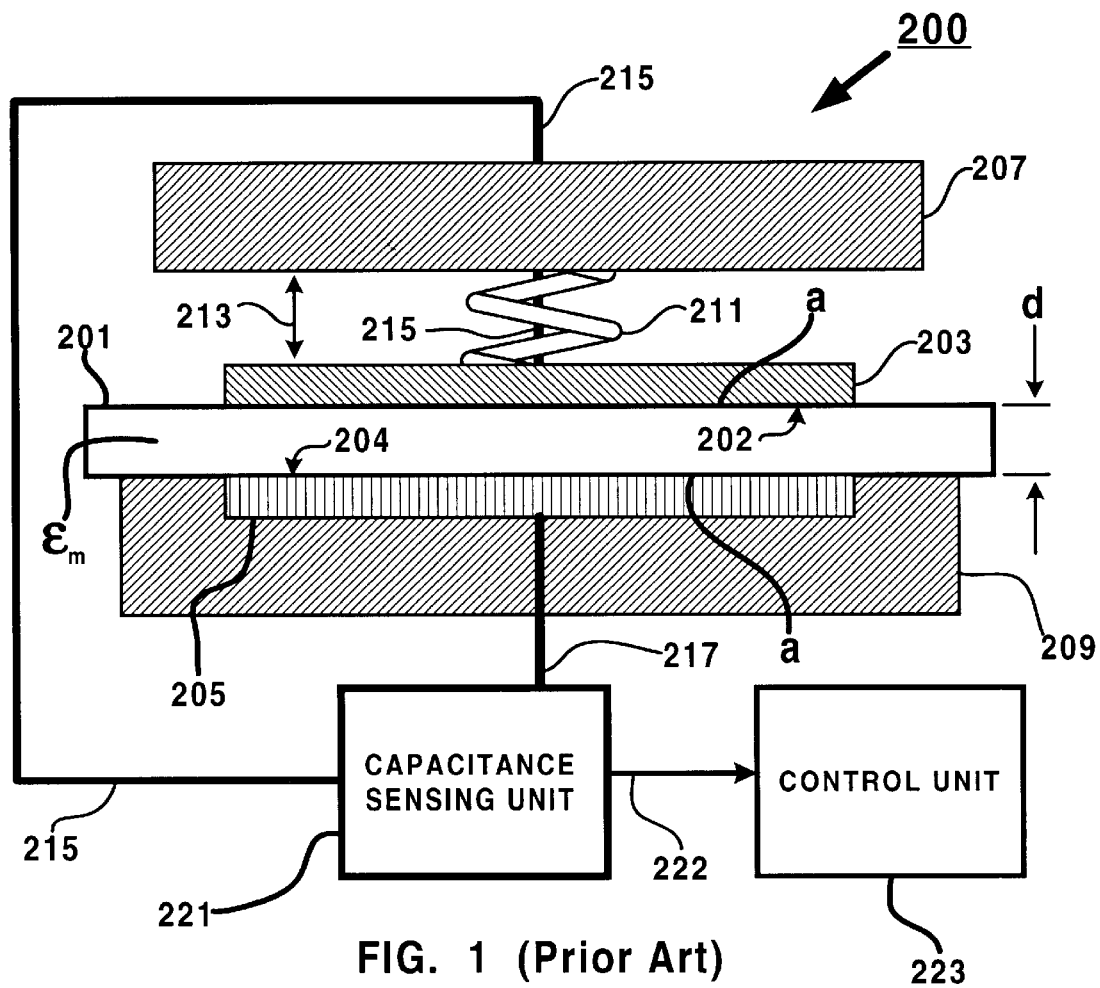
FIG. 1 is a cross-sectional view of a prior art capacitive thickness sensor.
Figure 2:
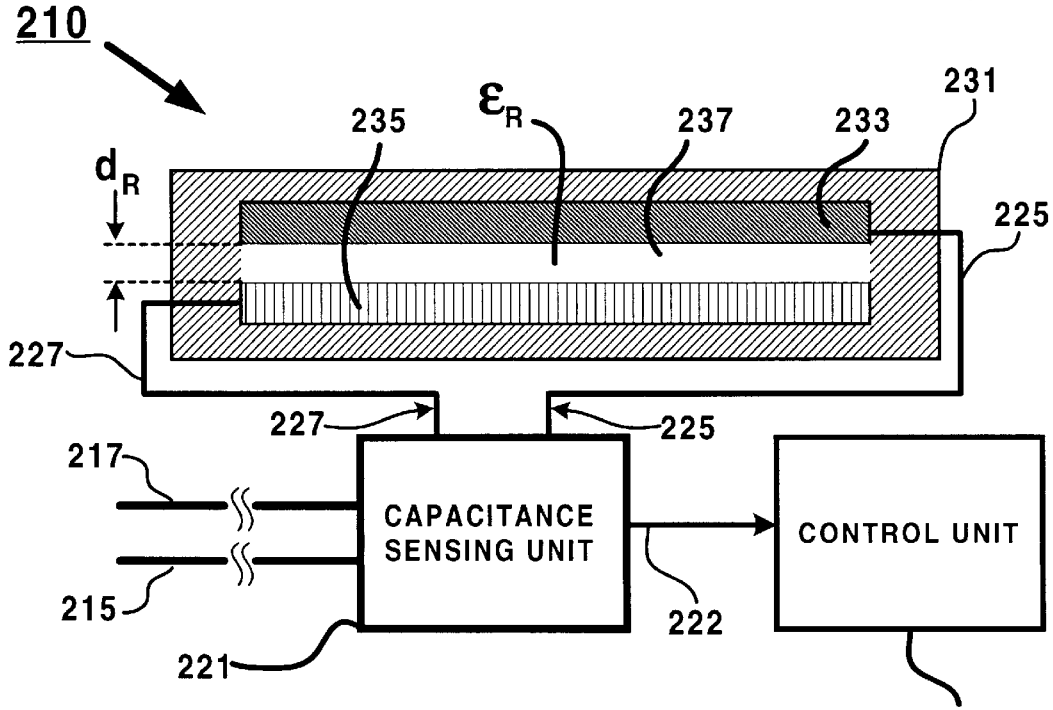
FIG. 2 is a cross-sectional view of a prior art reference capacitor used in conjunction with the prior art capacitive thickness sensor of FIG. 1.

In the following detailed description and in the several figures of the drawings, like elements are identified with like reference numerals.

As shown in the drawings for purpose of illustration, the present invention is embodied in a device for capacitively sensing media thickness that includes first and second supports having first and second electrodes disposed on a portion thereof respectively. The first and second supports are movable relative to each other in response to a media whose thickness is to be measured being urged into contact with either one of the supports. The first and second electrodes are the electrodes of a variable capacitance capacitor and are disposed opposite each other in facing relation. Preferably, the electrode do not contact each other. Consequently, there is a variable gap disposed intermediate between the electrodes. The capacitor includes a dielectric medium disposed in the variable gap. The dielectric medium can be a vacuum or a gas disposed in the variable gap wherein the capacitance of the capacitor is determined by the distance between the electrodes and the dielectric constant of the dielectric medium disposed in the variable gap.

The electrodes are spaced apart by a first distance when no media is in contact with the supports. When the media whose thickness is to be measured is urged into contact with either one of the supports, the supports are displaced and the electrodes are spaced apart by a second distance. The thickness of the media being measured can be derived by electronically measuring the capacitance between the electrodes when the electrodes are spaced apart by the second distance. The thickness of the media that is derived from the capacitance measured is completely independent of the dielectric properties of the media because the media is not physically in contact with the electrodes during the capacitance measurement and the media is not disposed between the electrodes during the measurement. Therefore, the capacitance measured is determined by the second distance between the electrodes and the dielectric constant of the dielectric medium disposed in the variable gap.

Because the electrodes do not contact or electrically interact with the media, the aforementioned problems associated with dielectric inconsistencies in the media are solved. Resulting is improved accuracy in thickness measurements due to eliminating the dielectric constant of the media from the capacitance measurement. The magnitude of the force necessary to firmly engage the electrodes into contact with the media is eliminated because only the supports contact the media during the capacitance measurement. Consequently, a reduced contact force can be used to engage the supports with the media thereby eliminating the aforementioned problems associated with compression of the media. Moreover, because the electrodes do not contact the media, the problems with damage to the media and the electrodes is eliminated. Additionally, the supports can be designed so that the tribology of the supports minimizes friction between the supports and the media at those portions of the supports that physically interface with the media.

Figure 3:
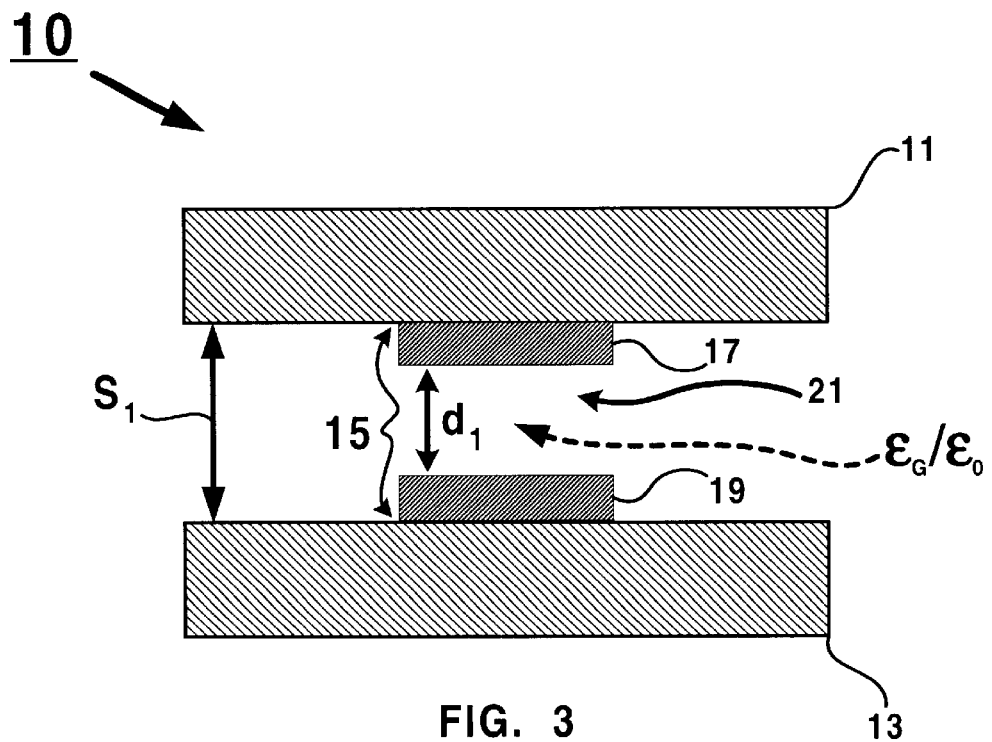
FIG. 3 is a cross-sectional view of a device for capacitively sensing media thickness with the electrodes spaced apart at a first distance according to the present invention.

In FIG. 3, a device for capacitively sensing media thickness 10 is illustrated. The device 10 includes a first support 11 and a second support 13, and a variable capacitance capacitor 15. Either one of the supports is movable relative to the other support. The capacitor 15 includes a first electrode 17 disposed on a portion of the first support 11, a second electrode 19 disposed on a portion of the second support 13, a variable gap 21 disposed intermediate between the first 17 and second 19 electrodes, and a dielectric medium (not shown) disposed in the variable gap 21. The dielectric medium can be a vacuum or a gas. The first 17 and second 19 electrodes are disposed opposite each other in substantially facing relation. Prior to a media thickness measurement, the first 11 and second 13 supports are spaced apart by a distance $S_1$ and the first 17 and second 19 electrodes are spaced apart by a first distance $d_1$. Although FIG. 3 illustrates the first distance $d_1$ being greater than zero, the first distance $d_1$ can be zero, i.e. the first 17 and second 19 electrodes can be contact with each other. Preferably, the first distance $d_1$ is greater than zero. However, if a reference capacitance measurement is to be made prior to a media thickness measurement (as will be discussed below) the first distance $d_1$ should be greater than zero so that the first 17 and second 19 electrodes are not shorted together.

Figure 4:
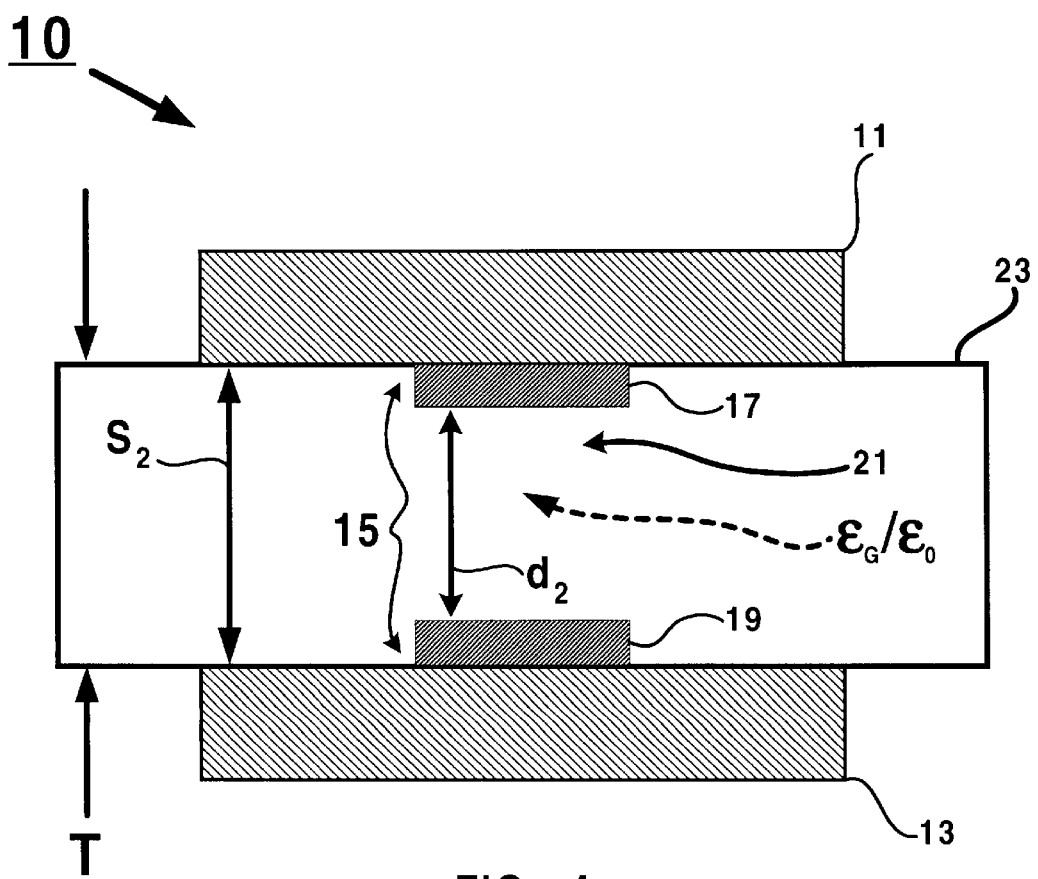
FIG. 4 is cross-sectional view of the device with the electrodes spaced apart at a second distance according to the present invention.

In FIG. 4, when the first 11 and second 13 supports and a media 23 whose thickness T is to be measured are urged into contact with one another, the supports are displaced relative to each other by a distance $S_2$ so that the first 17 and second 19 electrodes move from the first distance $d_1$ to a second distance $d_2$. By moving the first 17 and second 19 electrodes from the first distance $d_1$ to the second distance $d_2$, the spacing of the variable gap 21 changes with a resulting variation in the capacitance of the capacitor 15. In FIG. 4, the media 23 and the first 17 and second 19 electrodes are not in contact with one another and the media 23 is not disposed between the first 17 and second 19 electrodes. Consequently, the thickness T of the media 23 can be derived, irrespective of the dielectric properties of the media 23, by electronically measuring the capacitance between the first 17 and second 19 electrodes.

The capacitance of the capacitor 15 is determined by the second distance $d_2$ and a dielectric constant $\epsilon_G$ of the gas disposed in the variable gap 21 or a dielectric constant $\epsilon_0$ of the vacuum disposed in the variable gap 21. The dielectric constants ($\epsilon_G/\epsilon_0$) are shown by a dashed arrow in FIGS. 3 and 4. It will be obvious to one skilled in the art that if the area of the first 17 and second 19 electrodes is constant, then the variations in capacitance of the capacitor 15 will be primarily determined by the spacing between the first 17 and second 19 electrodes (i.e. $d_2$) and the dielectric constant $\epsilon_G$ of the gas disposed in the variable gap 21. The gas disposed in the variable gap 21 can be air or an inert gas such a nitrogen, for example. In printing appliances such as printers, copiers, and fax machines, air is an obvious choice for the dielectric medium. In applications in which the media 23 is contained in a closed environment, an inert gas such as nitrogen can be used. On the other hand, if a non-inert gas is used, the materials for the electrodes and the supports should be selected to resist any potential corrosive effects of the gas used. If a vacuum is used for the dielectric medium, then the device 10 can be disposed in an enclosure or in an environment that is under a vacuum.

Figure 5:
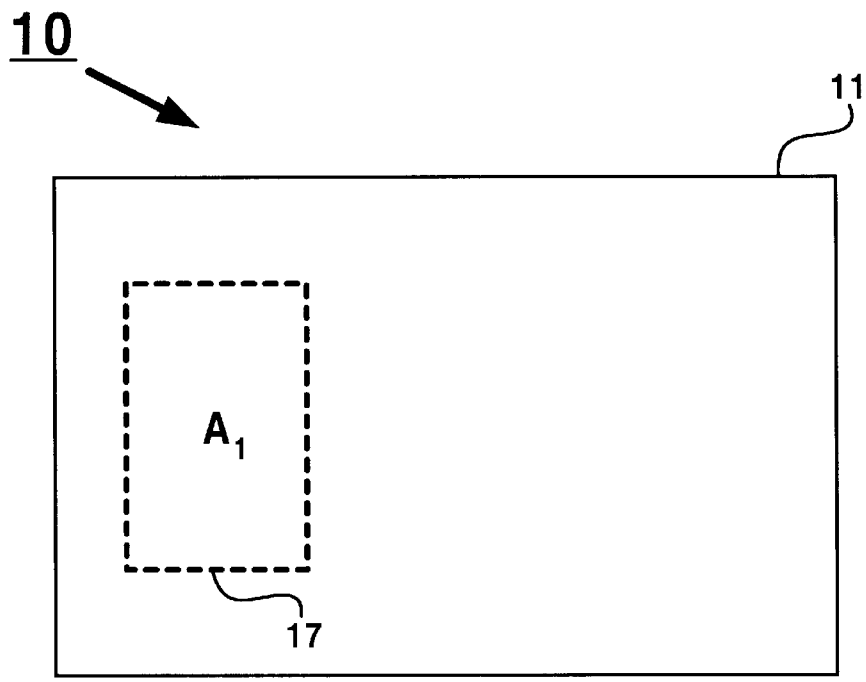
FIG. 5 is a top plan view of the device of FIG. 3.

In FIG. 5, a top plan view of the first support 11 with the first electrode 17 (shown in dashed outline) disposed below the first support 11 is illustrated prior to the media 23 (not shown) being urged into contact with the supports. The first electrode 17 has a predetermined surface area $A_1$. Although not shown in FIG. 5, the second electrode 19 has a predetermined surface area $A_2$. In a preferred embodiment of the present invention, the first 17 and second 19 electrodes have equal surface areas such that $A_1=A_2$ and the first 17 and second 19 electrodes have substantially equal shapes. For instance, the first 17 and second 19 electrodes can be rectangular in shape as shown in FIGS. 5, 6, 7, and 8. The shape of the electrodes will be application dependent and should not be construed as being limited to the shapes illustrated or discussed herein.

Figure 6:
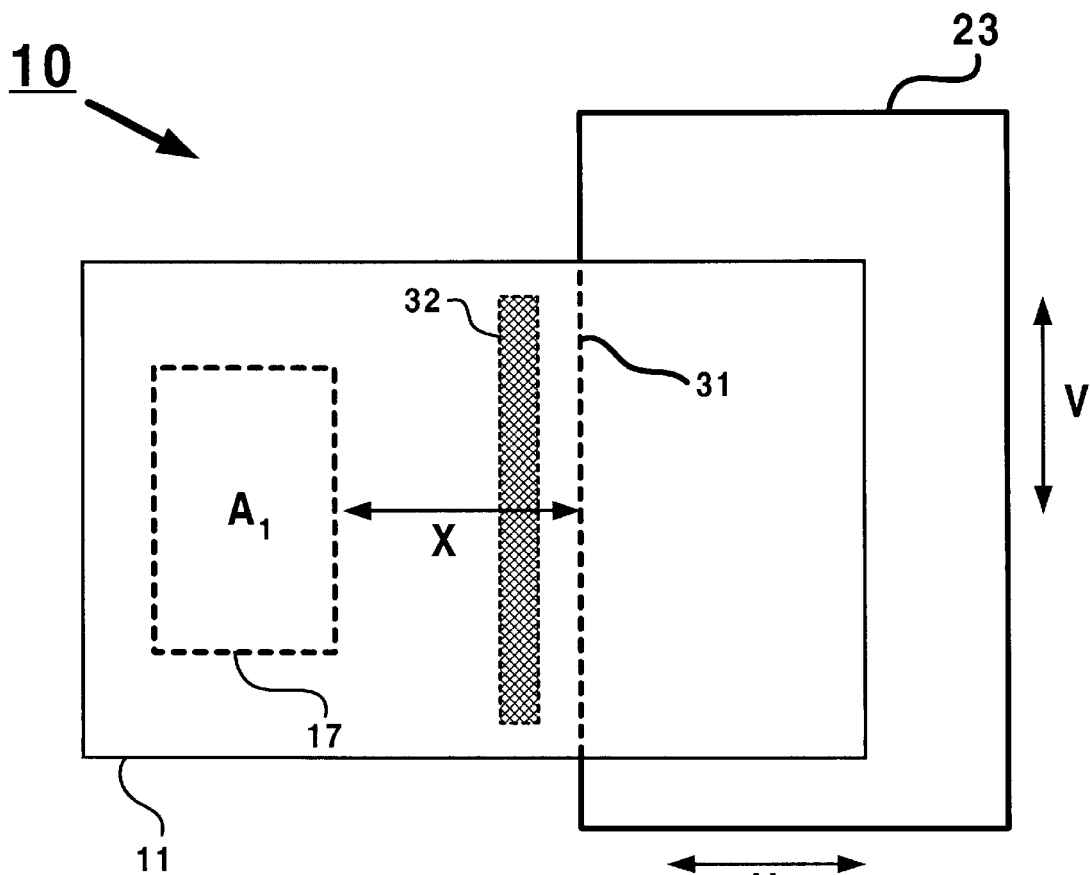
FIG. 6 is a top plan view of the device of FIG. 4 and illustrates the position of a media whose thickness is to be measured relative to an electrode according to the present invention.

FIG. 6 illustrates the spatial relationship between the first 17 and second 19 electrodes (only the first electrode 17 is shown) when the media 23 is urged into contact with the first 11 and second 13 supports (only the first support 11 is shown). An edge 31 of the media 23 is positioned a distance X away from the electrodes so that the media 23 is not in contact with the electrodes and is not disposed between the electrodes when a media thickness measurement is being made. The distance X should be sufficiently far away from the first 17 and second 19 electrodes so that fringe fields (not shown) emanating from the edges of the electrodes do not interact with the media 23. In essence, the distance X should be sufficiently far away from the electrodes so that dielectric properties of the media 23 do not interfere with the capacitance measured between the electrodes. A barrier 32 disposed on either one of the first 11 and second 13 supports can be used to physically prevent the media 23 from contacting the electrodes and to prevent the media 23 from interacting with the fringe fields.

The media 23 and the first 11 and second 13 supports can be urged into contact with one another in a variety of ways. For example, the media 23 can be urged into contact with the first 11 and second 13 supports in the directions shown by arrows H and V respectively, in FIG. 6. On the other hand, the first 11 and second 13 supports can be urged into contact with the media 23 in the directions shown by arrows H and V. In applications where the media 23 is a sheet of material such as a sheet of printer paper, for example, the first 11 and second 13 supports can be stationary with respect to the media 23 and the media is urged into contact with the supports. In applications where the media 23 is on a roll or is a continuous web of material, it may be desirable to urge the first 11 and second 13 supports into contact with the media 23.

Figure 7:
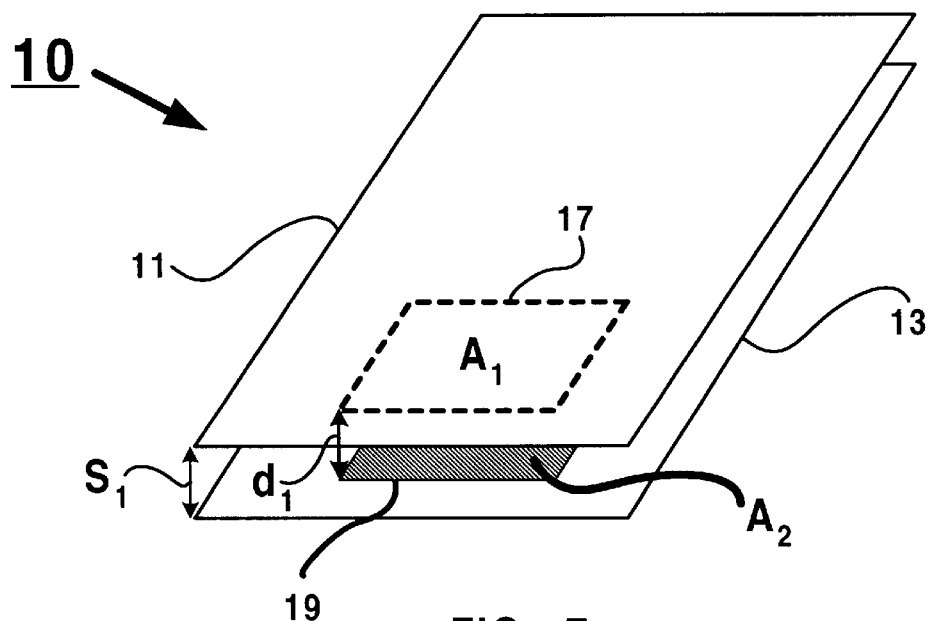
FIG. 7 is a plan view illustrating the electrodes when they are spaced apart by a first distance according to the present invention.
Figure 8:
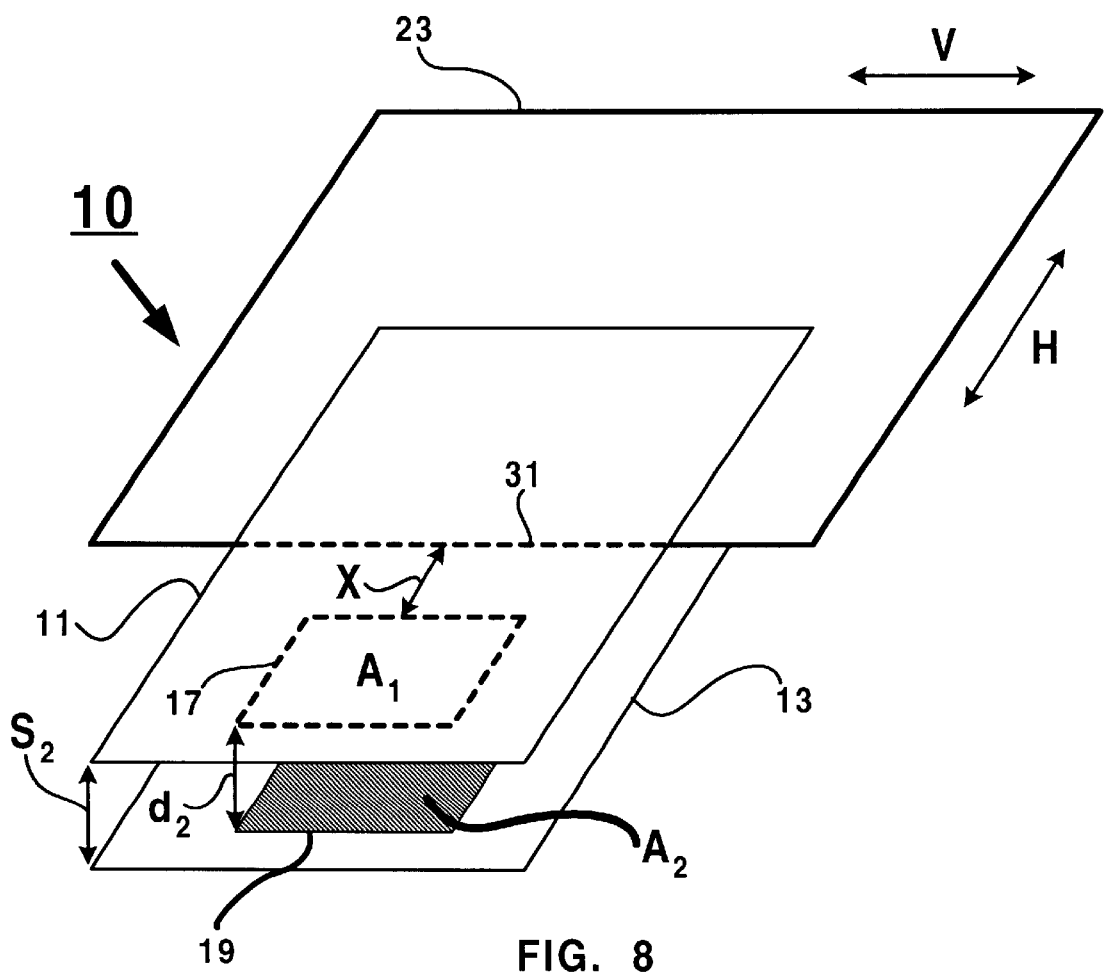
FIG. 8 is a plan view illustrating the electrodes when they are spaced apart by a second distance according to the present invention.

In one embodiment of the present invention, as illustrated in FIGS. 7 and 8, the second distance $d_2$ is greater than the first distance $d_1$. The capacitance of the capacitor 15 is inversely proportional to the distance between the first 17 and second 19 electrodes so that the capacitance of the capacitor 15 decreases as the first 17 and second 19 electrodes move from the first distance $d_1$ (see FIG. 7) to the second distance $d_2$ (see FIG. 8). On the other hand, the first distance $d_1$ can be greater than the second distance $d_2$. The capacitance of the capacitor 15 is proportional to the distance between the first 17 and second 19 electrodes so that the capacitance of the capacitor 15 increases as the first 17 and second 19 electrodes move from the first distance $d_1$ to the second distance $d_2$.

In another embodiment of the present invention, when the first 17 and second 19 electrodes are spaced apart by the first distance $d_1$, the capacitor 15 can have a capacitance in a range from about 5.0 pF to about 50.0 pF.

Figure 9:
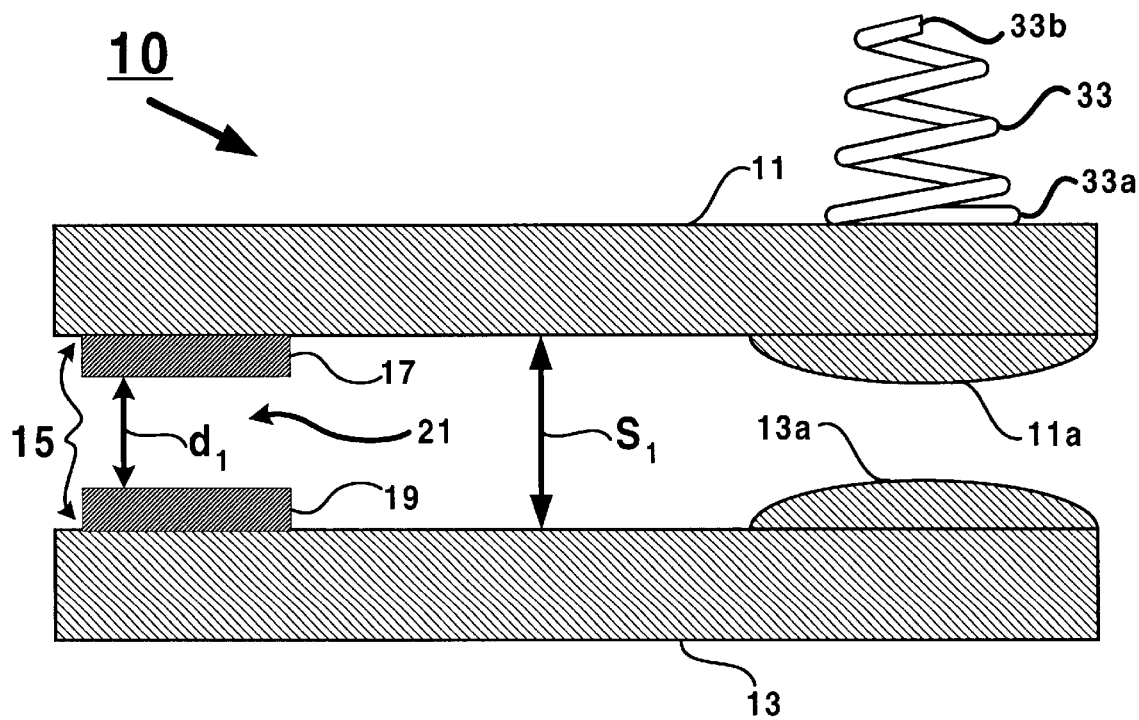
FIG. 9 is a cross-sectional view illustrating the electrodes spaced apart by the first distance prior to measuring the thickness of a media according to the present invention.
Figure 10:
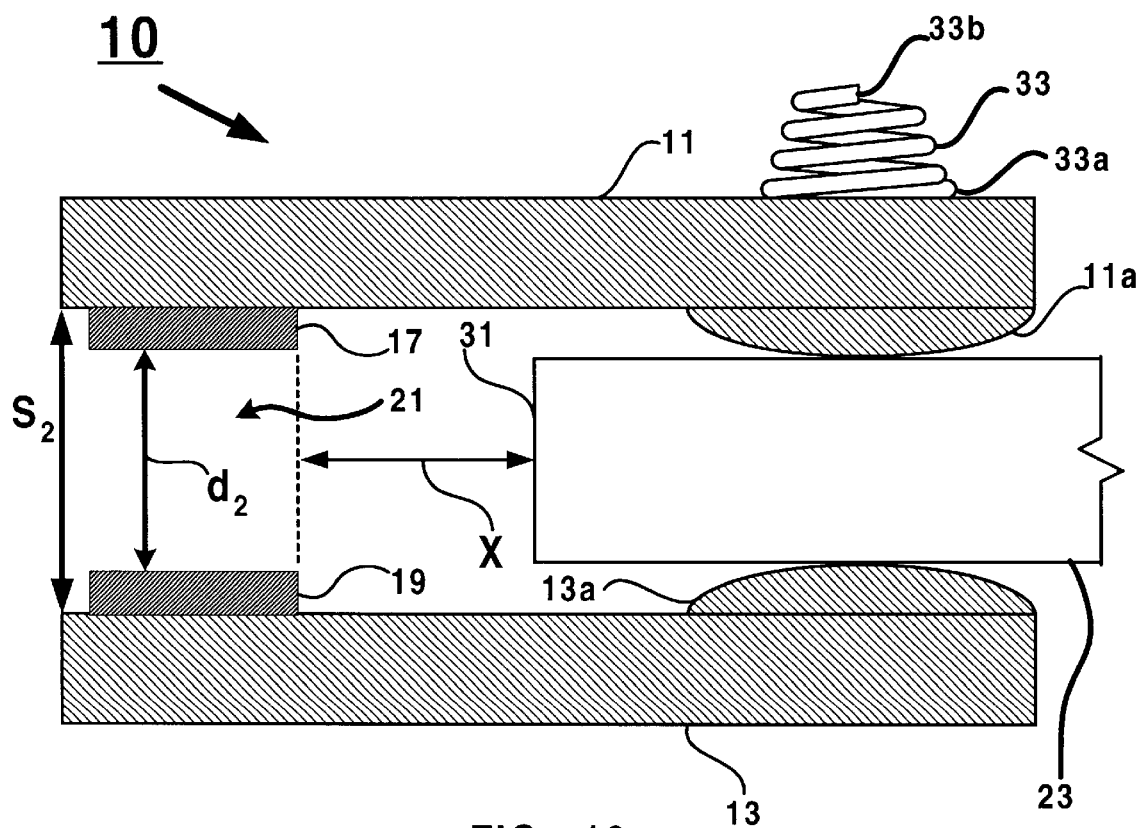
FIG. 10 is a cross-sectional view illustrating the electrodes spaced apart by the second distance during a media thickness measurement according to the present invention.

In one embodiment of the present invention, as illustrated in FIGS. 9 and 10, the device 10 includes a biasing member 33 adapted to urge either one of the first 11 and second 13 supports into good, even, and flat contact with at least a portion of the media 23. In FIG. 9 the biasing member 33 is connected at one end 33a to the first support 11, however, the biasing member 33 can be connected to the first support 11, the second support 13, or both supports. A second end 33b of the biasing member 33 can be connected to a portion of an apparatus (not shown) that contains the device 10, for example. The biasing member 33 is shown in an uncompressed state in FIG. 9; however, when the first 11 and second 13 supports and the media 23 are urged into contact with one another as shown in FIG. 10, the supports are displaced apart and the biasing member 33 is compressed and the first 11 and second 13 supports are urged into snug contact with at least a portion of the media 23 as illustrated in FIG. 10. In the embodiments illustrated in FIGS. 9 and 10 and in other embodiments described herein, the biasing member 33 can be a spring, a magnet, a dashpot, an elastic material, and a weight. For example, the first support 11 can have a weight disposed at an end thereof that is proximate to where the media 23 will engage the first support. Alternatively, a magnet can be used singularly or in combination with another magnet to provide the force necessary to urge the supports into snug contact with the media 23.

Additionally, a portion 11a and a portion 13a of the first 11 and second 13 supports can be shaped to reduce the contact area between the supports and the media 23 as illustrated in FIGS. 9 and 10. For instance, the shape can be an arcuate shape or a sloped shape. Benefits derived from shaping a portion of the supports include: reducing friction between the supports and the media 23, particularly if the media 23 is in motion during contact with the supports; reducing the surface area available to trap gas between the media 23 and the supports and to provide an escape path for trapped gas; and providing a smooth and contoured surface that will reduce the possibility of the media being damaged by the supports or jamming when the supports and the media are engaged with one another.

Figure 11:
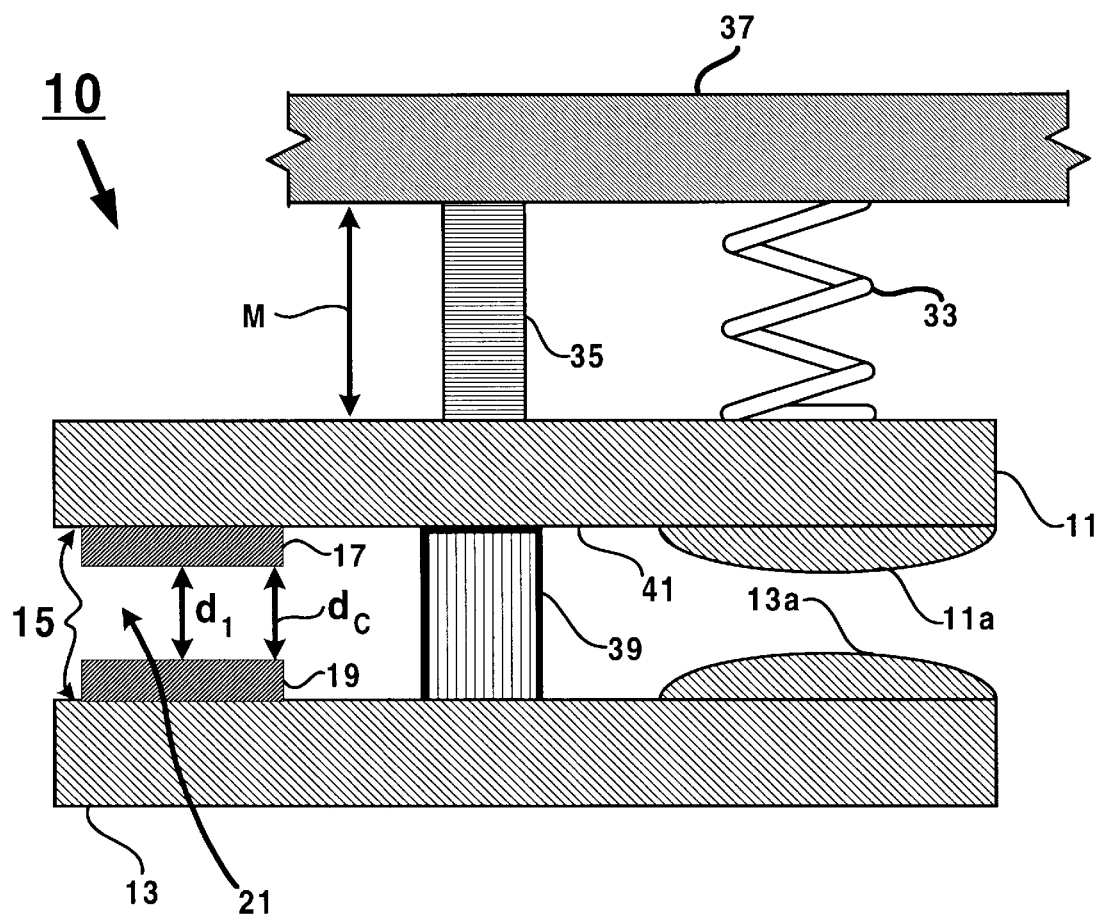
FIG. 11 is a cross-sectional view of the device and including a biasing member according to the present invention.
Figure 12:
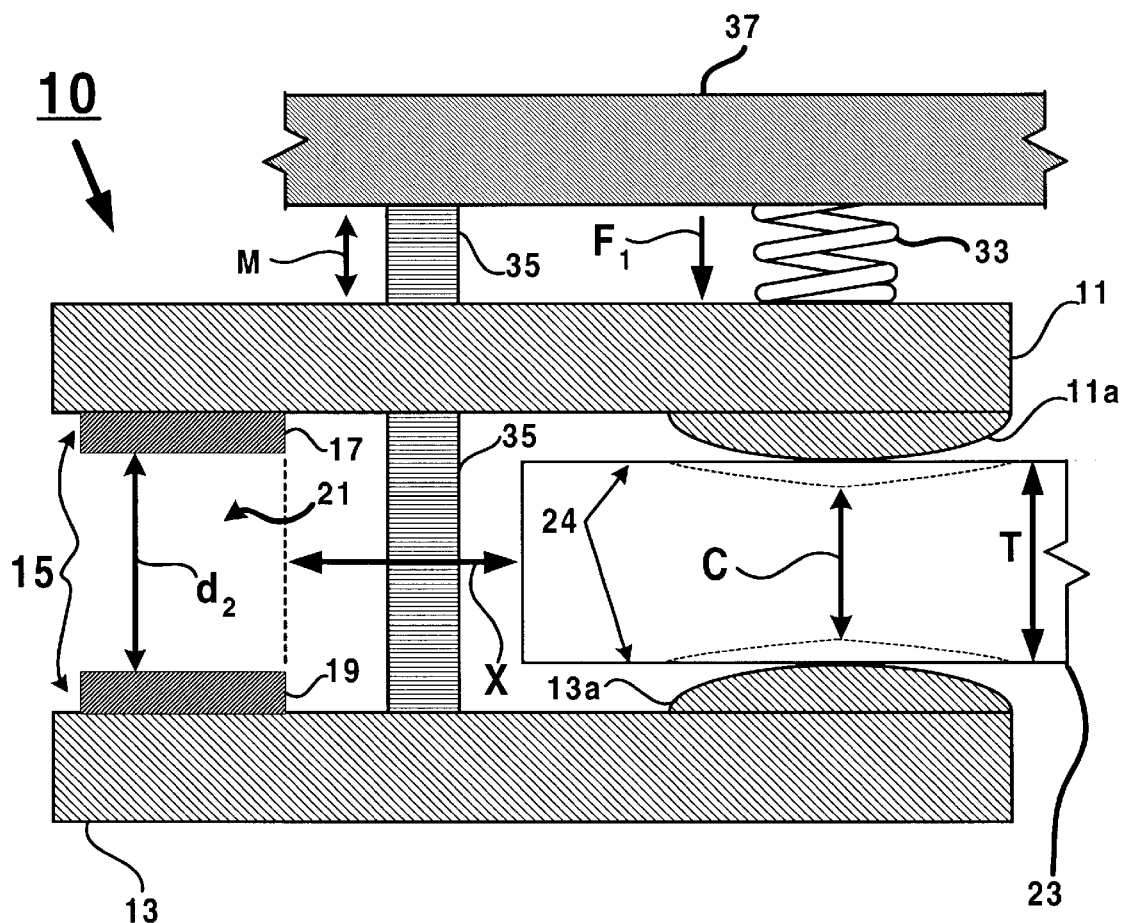
FIG. 12 is a cross-sectional view of the device and including a reference stop according to the present invention.

In another embodiment of the present invention, as illustrated in FIGS. 11 and 12, the first 11 and second 13 supports of the device 10 are disposed in opposition each other and the first electrode 17 is disposed in parallel relation to the second electrode 19. When the media 23 is urged between the first 11 and second 13 supports, the electrodes move apart from a first distance $d_1$ to the second distance $d_2$ and the electrodes are disposed in parallel relation to each other when the electrodes are spaced apart by the second distance $d_2$. As was mentioned above, the media 23 does not interact with the electrodes as shown by arrow X in FIG. 12. By disposing the electrodes in parallel relation to each other, a substantially linear relationship between capacitance of the capacitor 15 and the thickness T of the media 23 can be obtained, as will be discussed below.

In another embodiment of the present invention, as illustrated in FIGS. 11 and 12, the device 10 includes a biasing member 33 adapted to urge either one of the first 11 and second 13 supports into good, even, and flat contact with at least a portion of the media 23. The biasing member 33 urges the supports into contact with the media 23 with a first force $F_1$ (see FIG. 12) that is sufficient to maintain even and flat contact between the supports and the media 23, but the first force $F_1$ is below a threshold force necessary to compress C (show in dashed line) the media 23. Consequently, inaccuracies in measuring the thickness T of the media 23 due to compression of the media 23 are minimized. The biasing member 33 can be connected to a thrust bearing structure 37 and to either one of the supports. Either one of the supports can be moveably connected M to an alignment structure 35 that is adapted to allow either one of the supports to move freely along the alignment structure 35 as shown by arrow M and to maintain the parallel relation between the electrodes at the first distance $d_1$ and at the second distance $d_2$.

In one embodiment of the present invention, as illustrated in FIG. 11, the device 10 includes a reference stop 39 positioned so that when the electrodes are spaced apart by the first distance $d_1$, the biasing member 33 urges the supports toward each other so that either one of the supports is urged into contact with the reference stop 39. For example, a surface 41 of the first support 11 can be urged into contact with the reference stop 39. The reference stop 39 maintains a substantially constant spacing $d_c$ between the electrodes (i.e. the electrodes are held at a know separation) when the electrodes are spaced apart by the first distance $d_1$ so that the capacitance of the capacitor 15 is determined primarily by the dielectric constant of the dielectric medium and not by variations in spacing between the electrodes. By maintaining the substantially constant spacing $d_c$ when the electrodes are spaced apart by the first distance $d_1$, a reference capacitance can be electronically measured between the electrodes. The value of the reference capacitance can then be compared against an ideal value for the capacitance of the capacitor 15 when the electrodes are spaced apart by the first distance $d_1$ to determine a compensation factor to be used in compensating for environmental conditions. Those environmental conditions include temperature and humidity. It is well understood in the art that temperature and humidity are among the environmental factors that can affect the accuracy of capacitance measurements in capacitance based media thickness sensors. Therefore, when the electrode are spaced apart at the second distance $d_2$, the compensation factor can be used to compensate for environmental conditions that can affect the accuracy of the capacitance of the capacitor 15 measured between the electrodes when the electrodes are spaced apart by the first distance $d_2$. One advantage of the embodiment of FIG. 11 is that the same capacitor 15 is used for both the reference capacitance measurement and the media thickness measurement. Therefore, low cost and simplicity of design can be realized because fewer components are required to compensate for environmental conditions.

It is desirable for the reference stop 39 to be made from a low thermal expansion coefficient material so that temperature variations in the environment surrounding the device 10 do not substantially effect the constant spacing $d_c$. Suitable materials for the reference stop 39 include low thermal expansion coefficient materials such as ceramic, alumina, tungsten, molybdenum, nickel, nickel-iron alloy, quartz, INCONEL™, MONEL™, INVAR™, and KOVAR™. Additionally, it is desirable for the first support 11 and the second support 13 to be made from the same materials so that so that temperature variations in the environment surrounding the device 10 cause the supports to mechanically expand or contract at a similar rate. In applications requiring greater accuracy in the capacitance measurements, the supports can also be made from a low thermal expansion coefficient material, including the materials listed above.

Figure 13:
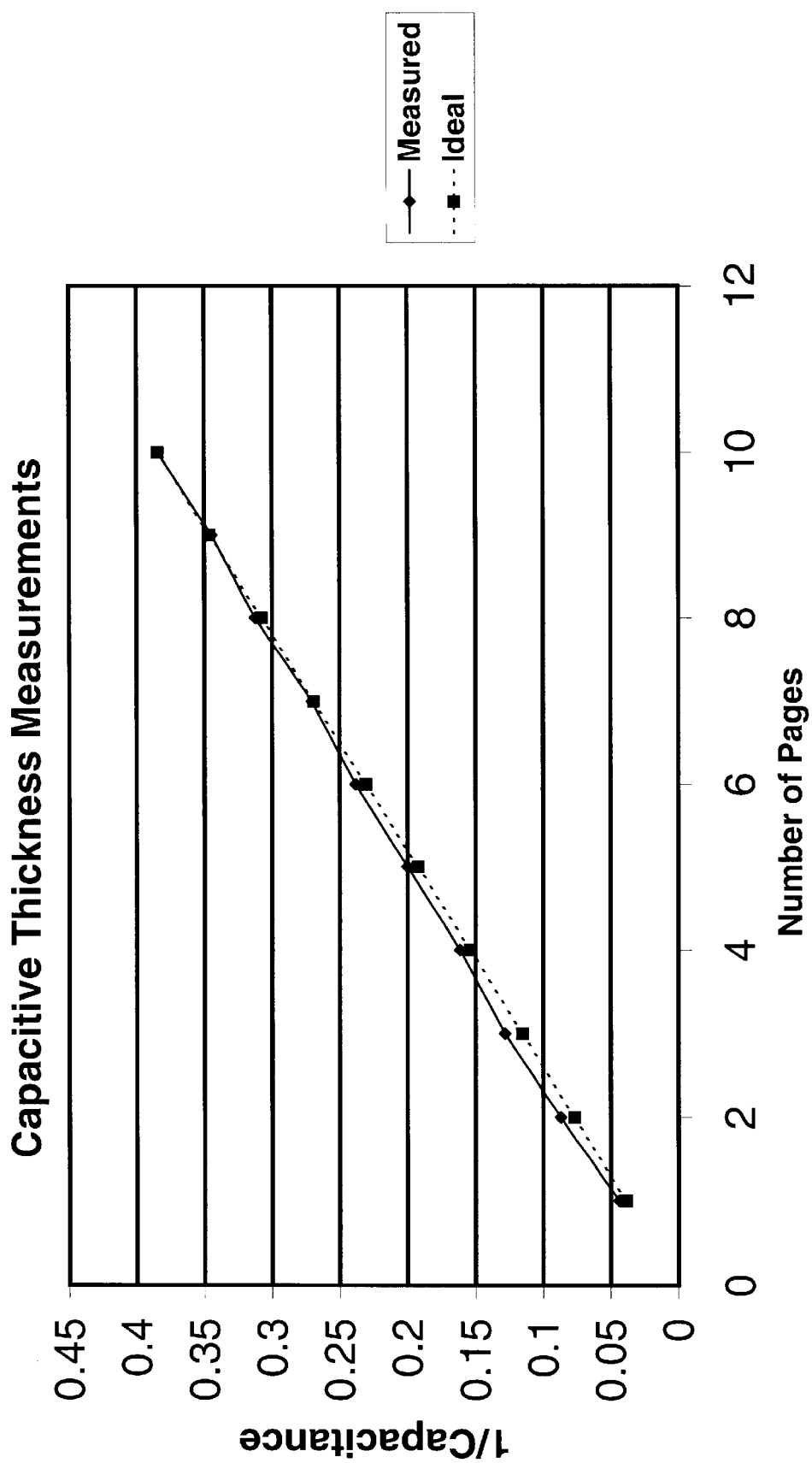
FIG. 13 is a graph of measured capacitance versus media thickness.

FIG. 13 illustrates a graph of capacitance versus media thickness for the embodiments of FIGS. 11 and 12 (i.e. parallel electrodes). Because the variable gap 21 increases when the electrodes move from the first distance $d_1$ to the second distance $d_2$, the capacitance of the capacitor 15 is inversely proportional to the distance between the electrodes. Accordingly, the graph of FIG. 13 plots 1/capacitance (1/pF) on the y-axis and media thickness (number of stacked pages) on the x-axis. Copier paper was used for the measurements as it compressed only slightly under pressure from the supports. Variations in media thickness were simulated by stacking more or fewer sheets of copier paper. The electrodes (17, 19) had identical dimensions of approximately 48 mm×4.8 mm; therefore, the electrodes (17, 19) had the same area and the same shape. The electrodes (17, 19) were long and skinny in order to maximize the area of the electrodes. The capacitance measured between the electrodes for one sheet of copier paper was 23.0 pF. Additional sheets of the copier paper were stacked and the thickness of the stack was measured using the device 10, until a total of ten sheets were stacked, yielding a capacitance of 2.60 pF. An ideal line (dashed line with a ■) was calibrated to a ten-sheet measurement where the approximate thickness of one sheet of the copier paper is approximately 3 mils to 4 mils (0.003 in to 0.004 in). A measured line (solid line with a ♦) shows a deviation from the ideal line ■ of no more than 13% or approximately 0.50 mils (0.00052 in). Deviations from the ideal can be reduced by minimizing to the extent possible the interactions between the fringe fields from the electrodes and the media being measured. Moreover, for stacked media, deviations in the thickness measurement can also be attributed to air trapped between adjacent layers of the media. Evacuating the trapped air or gas is one way to minimize deviations in the thickness measurement.

The linear relationship between capacitance and thickness can be used to determine the thickness of the media 23 by using the first distance $d_1$ and the ratio of the capacitance measured at the first distance $d_1$ and the capacitance measured at the first distance $d_2$. For instance, with electrodes having the same area, same shape, and disposed in parallel relation as shown in FIGS. 11 and 12, at the first distance $d_1$ a capacitance $C_1$ is given by:

$$C_1 = (\in_v * A_e) \div d_1$$

Where:
$C_1$=capacitance measured between the electrodes at the first distance $d_1$;
$\in_v$=dielectric constant of the dielectric medium (e.g. gas or vacuum) disposed in the variable gap 21;
$A_e$=The area of the electrodes (i.e. $A_1=A_2$); and
$d_1$=The spacing between the electrodes at the first distance $d_1$.

Furthermore, at the second distance $d_2$ a capacitance $C_2$ is given by:

$$C_2 = (\in_v * A_e) \div d_2$$

Where:
$C_2$=capacitance measured between the electrodes at the second distance $d_2$; and
$d_2$=The spacing between the electrodes at the second distance $d_2$.

The second distance $d_2$ is indicative of the thickness T of the media 23 and can be determined by the following equation:

$$d_2 = (C_1 \div C_2) * d_1;$$

Where:
$C_2 < C_1$; and
$d_1$ is a known distance or in the case where a reference stop (39, 59) is used $d_1$ is a substantially constant distance.

Figure 14:
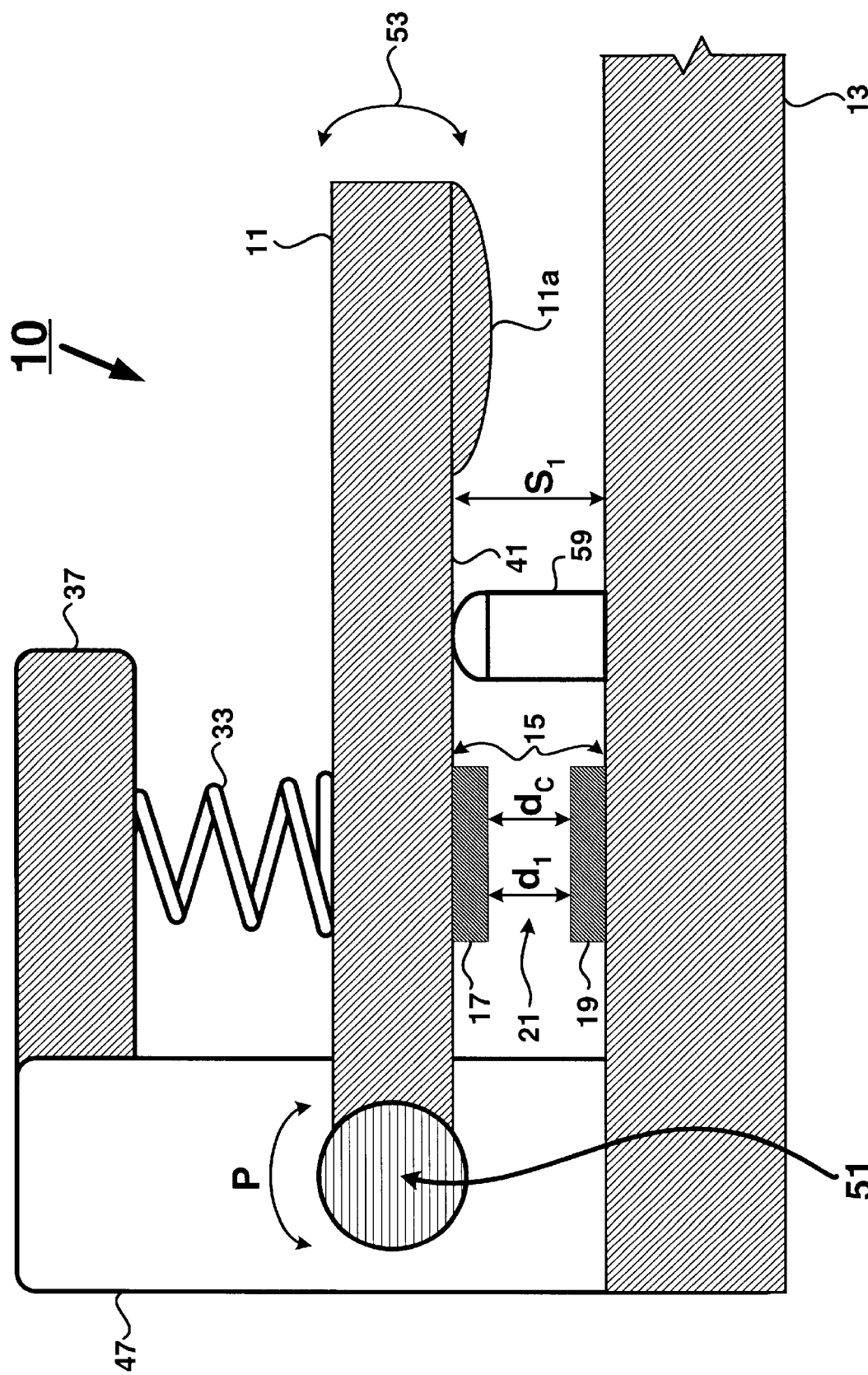
FIG. 14 is a cross-sectional view of the device with pivotally mounted supports with the electrodes spaced apart at the first distance according to the present invention.
Figure 15:
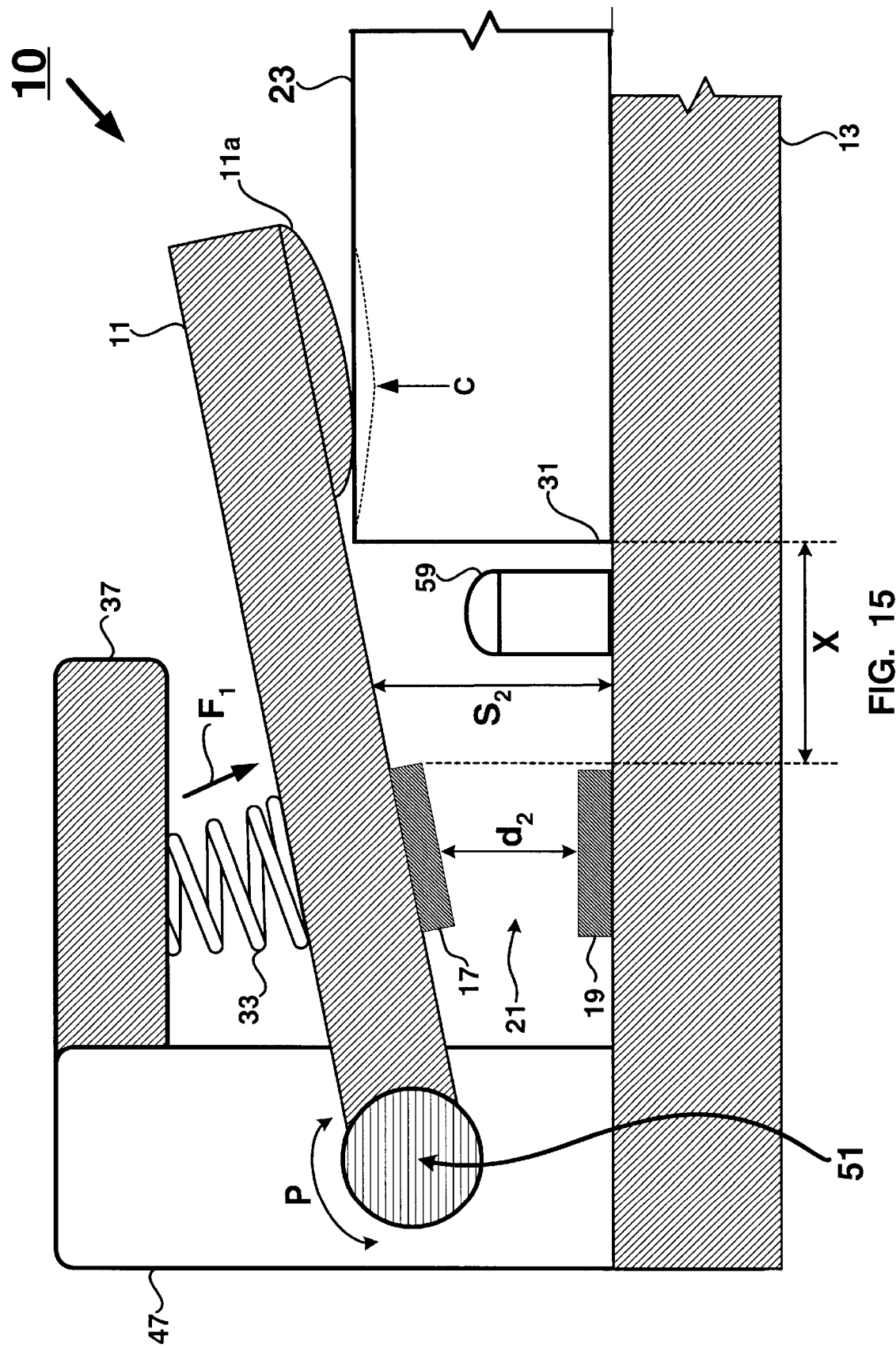
FIG. 15 is a cross-sectional view of the device with pivotally mounted supports with the electrodes spaced apart at the second distance according to the present invention.

In one embodiment of the present invention, as illustrated in FIGS. 14 and 15, the first support 11 and the second support 13 include a fulcrum end 51 and either one of the supports is pivotally mounted at the fulcrum end 51. Preferably, the first electrode 17 and the second electrode 19 are positioned substantially at the fulcrum end 51 of their supports 11 and 13 respectively. The electrodes are disposed in opposite of each other in substantially facing relation. When either one of the supports and the media 23 are urged into contact with one another, the supports pivot at the fulcrum end 51 and the electrodes move from the first distance $d_1$ to the second distance $d_2$.

Any method know in the art can be used to effectuate the pivotal mounting of the first support 11 and the second support 13. For example, in FIG. 14, a pivot structure 47 can have a hole formed therein (not shown) and the first support 11 can include a pin (not shown) that is inserted in the hole and freely rotates in the hole much like a shaft in a journal bearing. The tolerances of any components used to effectuate pivotal mounting of the first support 11 and the second support 13 should be selected so that the electrodes move apart in a substantially vertical arc 53 to prevent any relative lateral displacement between the electrodes.

In another embodiment of the present invention, as illustrated in FIGS. 14 and 15, the device 10 can include a biasing member 33 that is adapted to maintain good, even, and flat contact between the first 11 and second 13 supports and the media 23 as was discussed above in reference to FIGS. 9, 10, 11, and 12. The biasing member 33 urges the supports into contact with the media 23 with a first force $F_1$ (see FIG. 15) that is sufficient to maintain good, even, and flat contact between the supports and the media 23, but the first force $F_1$ is below a threshold force necessary to compress C (show in dashed line) the media 23. The biasing member 33 can be connected to a thrust bearing structure 37 as was discussed above in reference to FIG. 11.

In one embodiment of the present invention, the device 10 of FIGS. 14 and 15 can include a reference stop 59. The reference stop 59 performs an identical function as the reference stop 39 of FIG. 11 and can be made from the same materials as the reference stop 39.

Figure 16:
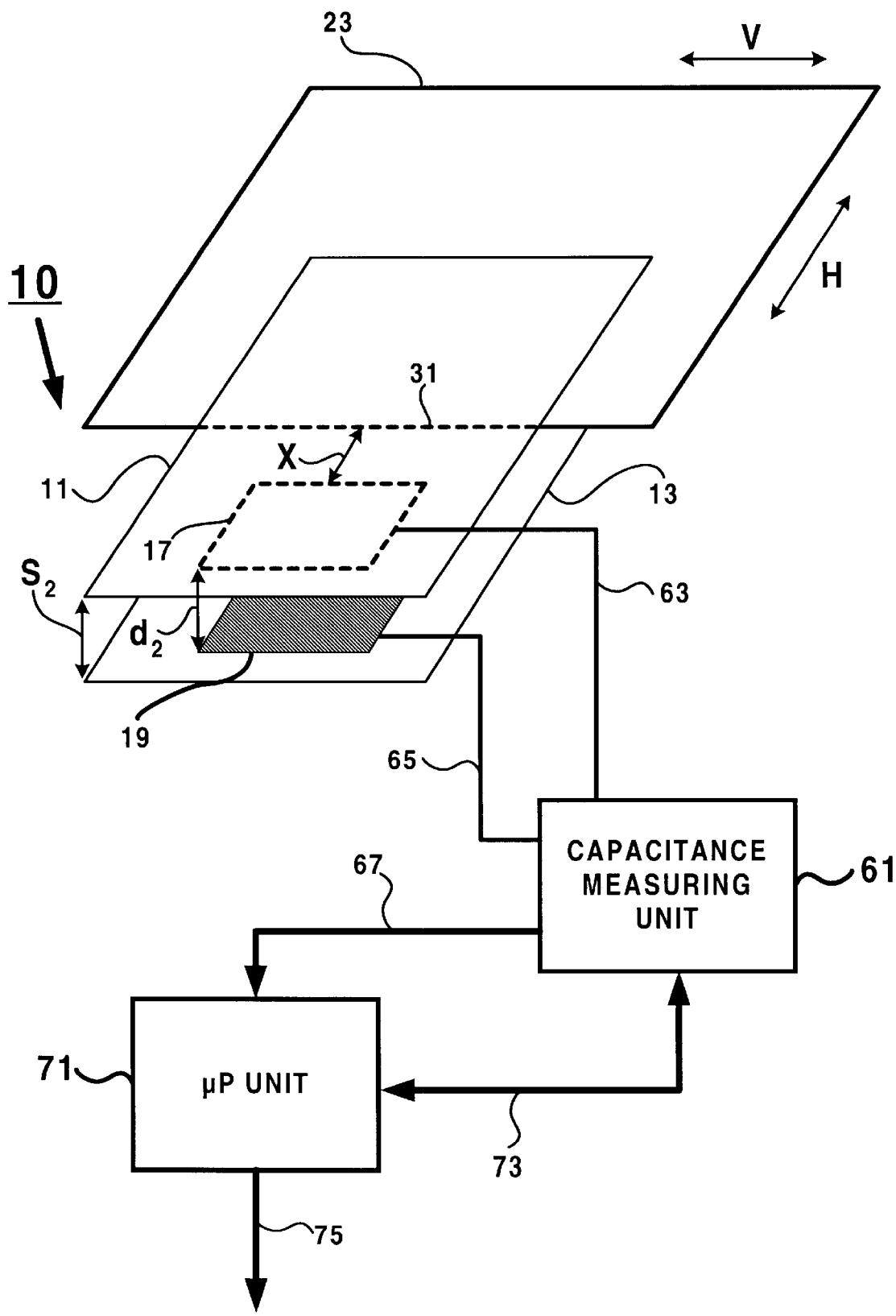
FIG. 16 is a plan view of a system for measuring the capacitance of the device according to the present invention.

Methods and circuitry for measuring the capacitance between the electrodes of the capacitor 15 of the present invention are well understood in the art. In FIG. 16, the first electrode 17 and the second electrode 19 are electrically connected to a capacitance measuring unit 61 by conductive leads 63 and 65 respectively. A signal indicative of the measured capacitance is provided on an output 67 of the capacitance measuring unit 61. For instance, the signal can be an analog signal or a digital signal. The output 67 can be read by a microprocessor ($\mu$P) unit 71. The $\mu$P unit 71 and the capacitance measuring unit 61 can communicate with each other over a bi-directional link 73. For example, the $\mu$P unit 71 can use the link 73 to instruct the capacitance measuring unit 61 to take a capacitance measurement and the capacitance measuring unit 61 can use the link 73 to signal the μP unit 71 that the measurement is completed and the signal can be read from the output 67. For instance, the variations in capacitance of the capacitor 15 can be used in an oscillation circuit to vary the frequency of oscillation. The signal 67 can be an analog or digital signal that is indicative of the oscillation frequency.

Figure 17:
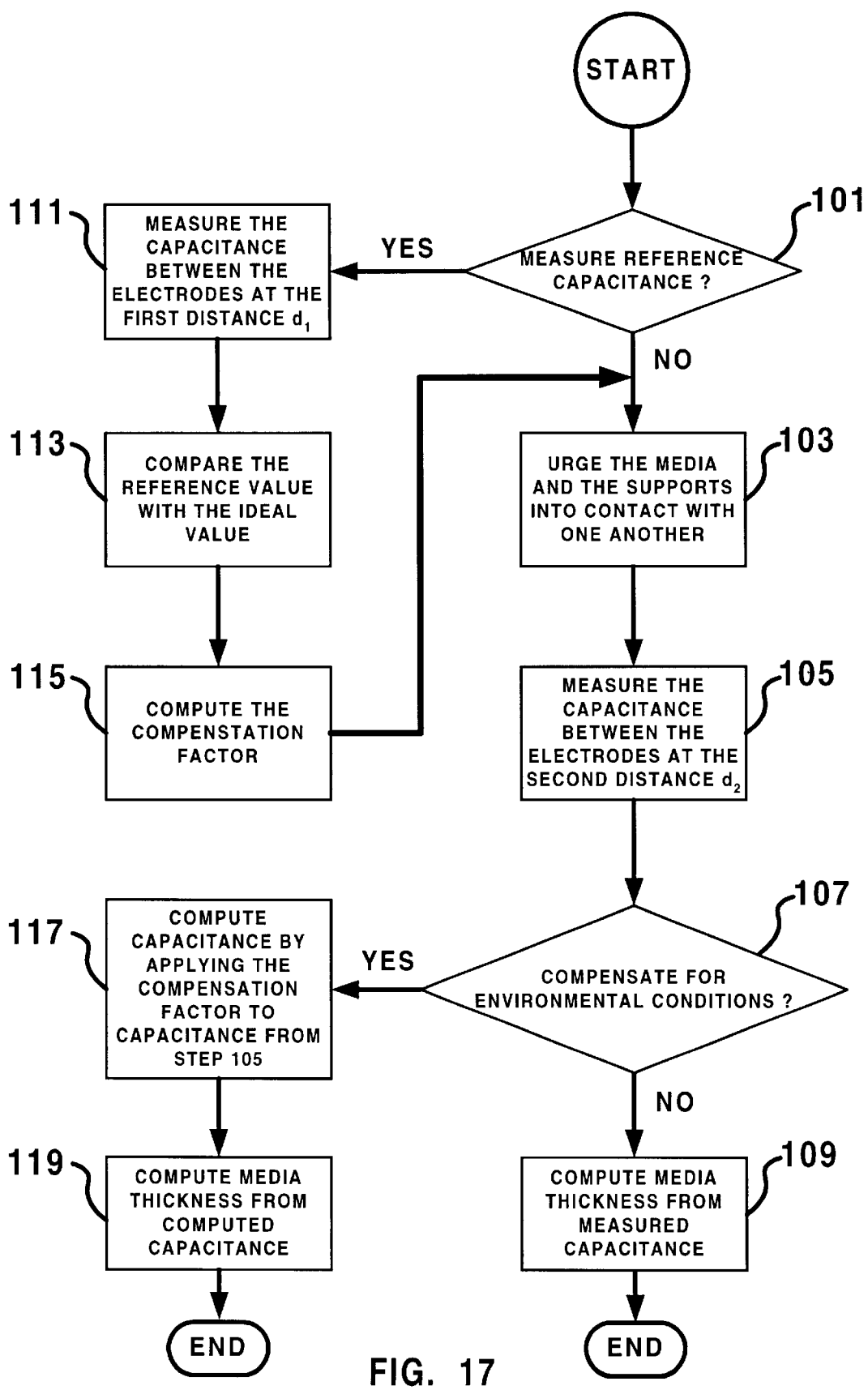
FIG. 17 is a flow chart of a method for using the device to measure the thickness of a media according to the present invention.

In FIG. 17, a process for measuring the thickness of a media is illustrated. First, a decision as to whether or not to take a reference capacitance measurement 101 can be made. If the NO path is selected, then the media and the supports are urged into contact 103. The capacitance between the electrodes at the second distance $d_2$ is measured 105. Because no reference capacitance was measured the NO path of step 107 is taken. The media thickness is computed 109 based on the capacitance measured in step 105 and the process ends. Step 105 can include a delay time to allow the media 23 and the supports to settle and/or to allow several capacitance measurements to be taken so that an average value can be obtained.

On the other hand, if it is desired to take a reference capacitance measurement 101, then the YES path of step 101 is taken and the capacitance between the electrodes at the first distance $d_1$ is measured 111. Next the reference value from step 111 is compared 113 with an ideal value. For instance, the μP unit 71 of FIG. 16 can have the ideal value stored in its memory. Next a compensation factor can be computed 115. Then steps 103 and 105 above are executed followed by taking the YES branch of step 107. The capacitance is computed 117 by applying the compensation factor of step 115 to the capacitance measured in step 105. Finally, the media thickness is computed 119 based on the capacitance computed in step 117 and the process ends. The μP unit 71 of FIG. 16 can be used to implement the process of FIG. 17; however, other methods know in the art can also be used.

For all of the embodiments described herein, the first electrode 17 and the second electrode 19 can be made from a variety of electrically conductive materials. For example, copper, gold, silver, platinum, rhodium, tungsten, or alloys thereof. The first support 11 and the second support 13 can also be made from a variety of materials. For instance plastic, ceramic, quartz, metal, or a composite material. For low cost applications plastic is an obvious choice. The material selected for the supports should be rigid enough to prevent flexion of the electrodes. The electrodes can be mounted to the supports using a fastener, an adhesive, a weld, or the like. Preferably, the supports should be made from an electrically non-conductive material; however, if a conductive material is used, care should be taken to properly insulate the electrodes from their respective supports.

Although several embodiments of the present invention have been disclosed and illustrated, the invention is not limited to the specific forms or arrangements of parts so described and illustrated. The invention is only limited by the claims.

What is claimed is:

1. A device for capacitively sensing media thickness, comprising:
    a first support;
    a second support; and
    a variable-capacitance capacitor comprising first and second electrodes having a variable gap disposed intermediate between the electrodes, and a dielectric medium disposed in the variable gap, the first electrode is disposed on a portion of the first support, the second electrode is disposed on a portion of the second support, and the dielectric medium is a dielectric selected from the group consisting of a vacuum and a gas,
    either one of the supports is movable relative to the other support and the supports are configured so that the electrodes are disposed opposite each other in substantially facing relation and are spaced apart by a first distance, and
    wherein the electrodes are spaced apart by a second distance when the media and either one of supports are urged into contact with one another thereby displacing the supports relative to each other so that the electrodes move from the first distance to the second distance,
    the media itself is not disposed between the electrodes, and the thickness of the media is derived, irrespective of the dielectric properties of the media, by electronically measuring a capacitance between the electrodes, and the capacitance between the electrodes is determined by the second distance between the electrodes and a dielectric constant of the dielectric medium disposed in the variable gap.

2. The device of claim 1, wherein the gas disposed in the variable gap is a gas selected from the group consisting of air and an inert gas.

3. The device of claim 1, wherein the second distance is greater than the first distance and the capacitance of the capacitor is inversely proportional to the distance between the electrodes so that the capacitance of the capacitor decreases as the electrodes move from the first distance to the second distance.

4. The device of claim 1, wherein the first distance is greater than the second distance and the capacitance of the capacitor is proportional to the distance between the electrodes so that the capacitance of the capacitor increases as the electrodes move from the first distance to the second distance.

5. The device of claim 1 and further comprising a biasing member adapted to urge either one of the first and second supports into snug mechanical contact with at least a portion of the media whose thickness is to be measured.

6. The device of claim 5, wherein the biasing member is a spring.

7. The device of claim 1, wherein the first and second supports are disposed in opposition to each other and the first and second electrodes are disposed parallel to each other so that when the media is urged between the supports the electrodes move from the first distance to the second distance and the electrodes are disposed parallel to each other when the electrodes are spaced apart by the second distance.

8. The device of claim 7, wherein the first electrode and the second electrode have substantially equal surface areas and the first electrode and the second electrode have substantially equal shapes.

9. The device of claim 7 and further comprising:
    a biasing member adapted to urge either one of the first and second supports into mechanical contact with at least a portion of the media,
    the biasing member urges the supports into contact with the media with a first force that is sufficient to maintain even and flat contact between the supports and the media, and
    the first force is below a predetermined threshold force necessary to compress the media so that inaccuracies in sensing the thickness of the media caused by compression of the media are minimized.

10. The device of claim 9, wherein the biasing member is a spring.

11. The device of claim 9 and further comprising:
    a reference stop positioned so that when the electrodes are spaced apart by the first distance, the biasing member urges the supports towards each other so that either one of the supports is urged into contact with the reference stop, and the reference stop is operative to maintain a substantially constant spacing between the electrodes when the electrodes are spaced apart by the first distance so that the capacitance of the capacitor is determined primarily by the dielectric constant of the dielectric medium and not by variations in spacing between the electrodes.

12. The device of claim 11, wherein when the electrodes are spaced apart by the first distance a reference capacitance is electronically measured between the electrodes, and the value of that capacitance is compared against an ideal value for the capacitance when the electrodes are spaced apart by the first distance to determine a compensation factor, and the compensation factor is used to compensate for environmental conditions including temperature and humidity that can affect the accuracy of the capacitance measured between the electrodes when the electrodes are spaced apart by the second distance.

13. The device of claim 11, wherein the reference stop is a low thermal expansion coefficient material selected from the group consisting of ceramic, alumina, tungsten, molybdenum, nickel, nickel-iron alloy, quartz, INCONEL, MONEL, INVAR, and KOVAR.

14. The device of claim 1, wherein both the first and second supports include a fulcrum end and either one of the supports is pivotally mounted at the fulcrum end, and the first and second electrodes are positioned substantially at the fulcrum end of their respective supports and are disposed opposite each other in substantially facing relation so that when either one of the supports and the media are urged into contact with one another the supports pivot at the fulcrum end and the electrodes move from the first distance to the second distance.

15. The device of claim 14 and further comprising:

a biasing member adapted to urge either one of the first and second supports into mechanical contact with at least a portion of the media, the biasing member urges the supports into contact with the media with a first force that is sufficient to maintain even and flat contact between the supports and the media, and the first force is below a predetermined threshold force necessary to compress the media so that inaccuracies in sensing the thickness of the media caused by compression of the media are minimized.

16. The device of claim 15, wherein the biasing member is a spring.

17. The device of claim 15 and further comprising:

a reference stop positioned so that when the electrodes are spaced apart by the first distance the biasing member urges the supports towards each other so that either one of the supports is urged into contact with the reference stop, and the reference stop is operative to maintain a substantially constant spacing between the electrodes when the electrodes are spaced apart by the first distance so that the capacitance of the capacitor is determined primarily by the dielectric constant of the dielectric medium and not by variations in spacing between the electrodes.

18. The device of claim 17, wherein when the electrodes are spaced apart by the first distance a reference capacitance is electronically measured between the electrodes and the value of that capacitance is compared against an ideal value for the capacitance at the first distance to determine a compensation factor, and the compensation factor is used to compensate for environmental conditions including temperature and humidity that can affect the accuracy of the capacitance measured between the electrodes when the electrodes are spaced apart by the second distance.

19. The device of claim 17, wherein the reference stop is a low thermal expansion coefficient material selected from the group consisting of ceramic, alumina, tungsten, molybdenum, nickel, nickel-iron alloy, quartz, INCONEL, MONEL, INVAR, and KOVAR.

20. The device of claim 1, wherein when the electrodes are spaced apart by the first distance the capacitance of the capacitor is in a range from about 5.0 pF to about 50.0 pF.

21. The device of claim 1, wherein the second distance is indicative of the thickness of the media and the second distance is determined by dividing a capacitance measured at the first distance by a capacitance measured at the second distance and multiplying a quotient therefrom by the first distance.

* * * * *